(12) United States Patent
Frey et al.

(10) Patent No.: US 8,166,156 B2
(45) Date of Patent: Apr. 24, 2012

(54) FAILURE DIFFERENTIATION AND RECOVERY IN DISTRIBUTED SYSTEMS

(75) Inventors: Jan Frey, Hünster (DE); Ulrich U. Müller, Aachen (DE); Mikko T. Suni, Espoo (FI)

(73) Assignee: Nokia Corporation, Espoo (FI)

( * ) Notice: Subject to any disclaimer, the term of this patent is extended or adjusted under 35 U.S.C. 154(b) by 649 days.

(21) Appl. No.: 11/606,093

(22) Filed: Nov. 30, 2006

(65) Prior Publication Data

US 2008/0129464 A1     Jun. 5, 2008

(51) Int. Cl.
*G06F 15/173* (2006.01)

(52) U.S. Cl. ........ 709/224; 709/223; 709/232; 709/238; 370/242; 370/412

(58) Field of Classification Search .................. 709/246, 709/223–224; 370/401, 216, 230, 389
See application file for complete search history.

(56) References Cited

U.S. PATENT DOCUMENTS

| | | | |
|---|---|---|---|
| 6,195,760 B1 * | 2/2001 | Chung et al. ..................... 714/4 |
| 6,260,073 B1 * | 7/2001 | Walker et al. .................. 709/249 |
| 6,532,497 B1 * | 3/2003 | Cromer et al. ................. 709/250 |
| RE38,309 E * | 11/2003 | Frazier et al. ................. 370/231 |
| 6,651,190 B1 * | 11/2003 | Worley et al. .................... 714/43 |
| 6,788,680 B1 * | 9/2004 | Perlman et al. ............... 370/389 |
| 6,954,460 B2 * | 10/2005 | DeMars ......................... 370/392 |
| 7,002,975 B2 * | 2/2006 | Galicki et al. ................. 370/401 |
| 7,420,930 B2 * | 9/2008 | Usuba ........................... 370/252 |
| 7,454,494 B1 * | 11/2008 | Hedayat et al. ............... 709/224 |
| 7,596,094 B2 * | 9/2009 | Puppa et al. ................... 370/242 |
| 7,673,168 B2 * | 3/2010 | Matsuda ............................ 714/4 |
| 7,793,093 B2 * | 9/2010 | Fujita et al. .................... 713/151 |
| 7,843,831 B2 * | 11/2010 | Morrill et al. ................. 370/235 |
| 7,986,634 B2 * | 7/2011 | Kang et al. .................... 370/252 |
| 8,023,417 B2 * | 9/2011 | Blackmore et al. ........... 370/242 |
| 2002/0018480 A1 * | 2/2002 | Galicki et al. ................. 370/401 |
| 2002/0095600 A1 * | 7/2002 | Deen et al. .................... 713/201 |
| 2002/0152432 A1 * | 10/2002 | Fleming .......................... 714/47 |
| 2002/0191793 A1 * | 12/2002 | Anand et al. .................. 380/255 |
| 2003/0053452 A1 * | 3/2003 | Timperman et al. .......... 370/389 |
| 2003/0123387 A1 * | 7/2003 | Jackson ......................... 370/230 |
| 2003/0123662 A1 * | 7/2003 | Jo et al. ......................... 380/213 |
| 2003/0195979 A1 * | 10/2003 | Park .............................. 709/231 |
| 2004/0015598 A1 * | 1/2004 | Lin ................................ 709/232 |
| 2004/0044720 A1 * | 3/2004 | Jang et al. ..................... 709/200 |
| 2004/0199660 A1 * | 10/2004 | Liu ................................ 709/236 |
| 2004/0230859 A1 * | 11/2004 | Cochran et al. ................... 714/2 |
| 2004/0267891 A1 * | 12/2004 | Hoeye et al. .................. 709/206 |
| 2005/0204058 A1 * | 9/2005 | Philbrick et al. .............. 709/238 |
| 2005/0232227 A1 * | 10/2005 | Jorgenson et al. ............ 370/351 |
| 2005/0249123 A1 * | 11/2005 | Finn .............................. 370/242 |
| 2005/0259651 A1 * | 11/2005 | Yashima ........................ 370/389 |
| 2006/0133298 A1 * | 6/2006 | Ng et al. ........................ 370/254 |
| 2006/0156140 A1 * | 7/2006 | Van Haegendoren et al. ............................. 714/741 |
| 2006/0171331 A1 * | 8/2006 | Previdi et al. ................. 370/254 |
| 2006/0235949 A1 * | 10/2006 | Tai et al. ....................... 709/219 |
| 2006/0251011 A1 * | 11/2006 | Ramakrishnan et al. ..... 370/328 |
| 2006/0253539 A1 * | 11/2006 | Casperson et al. ............ 709/207 |

(Continued)

*Primary Examiner* — Wing Chan
*Assistant Examiner* — Razu Miah
(74) *Attorney, Agent, or Firm* — Harrington & Smith

(57) ABSTRACT

According to an embodiment, a method comprises receiving a data packet including an indication comprising a process state indication and a transmission state indication, comparing the indication with an expected indication, and determining if the data packet is valid or not based on a result of the comparison.

46 Claims, 5 Drawing Sheets

Process Failure

U.S. PATENT DOCUMENTS

| | | | | |
|---|---|---|---|---|
| 2006/0257144 | A1* | 11/2006 | Wai et al. | 398/51 |
| 2006/0268913 | A1* | 11/2006 | Singh et al. | 370/412 |
| 2007/0115821 | A1* | 5/2007 | Sim et al. | 370/231 |
| 2007/0208782 | A1* | 9/2007 | Carter et al. | 707/201 |
| 2007/0211623 | A1* | 9/2007 | Nishioka | 370/218 |
| 2007/0226532 | A1* | 9/2007 | Matsuda | 714/4 |
| 2007/0255819 | A1* | 11/2007 | Hua et al. | 709/224 |
| 2008/0049626 | A1* | 2/2008 | Bugenhagen et al. | 370/241 |
| 2008/0049769 | A1* | 2/2008 | Bugenhagen | 370/401 |
| 2008/0112333 | A1* | 5/2008 | Busch et al. | 370/252 |
| 2008/0159129 | A1* | 7/2008 | Songhurst et al. | 370/229 |

* cited by examiner

FAILURE DIFFERENTIATION AND RECOVERY IN DISTRIBUTED SYSTEMS

FIELD AND BACKGROUND OF THE INVENTION

The present invention relates to distributed software systems. In particular, the invention relates to monitoring a process status based on transmitted data packets.

As an example of a distributed system, high-performance computer clusters are implemented to provide increased performance by splitting computational tasks across several computers in the cluster. Such a setup is often not only much more cost-effective than a single computer of comparable speed, but in many cases it is also the only way to further increase the computational power and reliability needed by evolving applications. Another good example of a distributed system is complex operator telecommunication equipment, like e.g. the Radio Network Controller (RNC) in a Radio Access Network (RAN), producing huge workload and demanding high reliability.

In order to distribute the workload among nodes in a distributed system, efficient communication (high bandwidth, low delay, tolerable data loss/corruption while demanding only little resources) between the nodes is indispensable, usually provided by light-weight transport protocols.

The term "node" shall be understood as a "computer" in a distributed system, or a telecom network element in a telecom network, or a part of modular telecom network element, which is running at least one process.

Requirements of network transport protocols targeted for utilisation in distributed systems are driven by a few factors only: high efficiency and robustness against failures, which are further divided into failures of nodes or parts of a node (e.g. hardware malfunction or process restart/SW failure) and failures of the communication network in-between (congestion, line break, etc.). Currently, robustness is often neglected, but steadily growing size and complexity of distributed systems increase the probability of failures drastically. This emphasizes importance of precise error detection and efficient recovery.

Taking a look at the mostly used transport protocol TCP (Transport Control Protocol), these requirements are fulfilled only to a certain extent: although TCP is fault-tolerant in a general manner, it is not able to recognize the specific kind of transmission failure: behaviour is identical in case of network failure (e.g. transmission congestion) or a node related failure (e.g. a node or process restart). But it would be beneficial to distinct between these types of transmission failures. The key difference is that the state between two communicating processes, defined by the history of the earlier communication between them, remains intact in case of a transmission failure, whereas in case of node related failure the state is lost and thus corrective actions may be necessary in the survived peer process. For instance, data transmission could be recovered after a network line break recovers without losing the connection. Further on, if a process fails corrective actions might be taken, for instance workload re-distribution or internal resource cleanup. Here, TCP (and also other available protocols) lack these features of recognizing and correcting such problems.

Furthermore, the costly retransmission mechanism of TCP reduces transport efficiency (due to acknowledgements and data retransmission transmitted between the processes), and even more problematic adds a remarkable processing overhead to each process required for inter-node communication, which is especially critical in the case of distributed system where all processes need to communicate with each other, often resulting in a huge number of connections which need to be maintained within the nodes.

Classical (connection-oriented) transport protocols allow the detection of process and network failures by informing about unexpected connection loss. However, this does not allow differentiation between process and network failures. TCP is a well-known example for this case: error recovery is based on timeouts due to missing acknowledgements from the receiving side. Consequently it takes a long time until a process failure is recognised. In this case the whole connection needs to be released and re-established, causing an even longer down-time of the affected process.

An improvement with respect to process failure detection is introduced by SCTP (Streaming Control Transmission Protocol), which is using special "Heartbeat Request" chunks in the packet header to gather another process' status: a node receiving such a request must respond sending a "Heartbeat Acknowledgement". This speeds up failure detection remarkably but also adds network overhead, especially in distributed systems, where in worst-case scenario each process is communicating with every other one in the system.

A similar approach is being followed in SS7 (Signalling System No. 7) signalling stack: "Signalling Link Test Messages" (SLTM) and "Signalling Link Test Acknowledgements" (SLTA) are exchanged in Message Transfer Part (MTP) to detect network failures and node related failures.

And still, both protocols lack the differentiation between network and node related failures in the system.

Another transport protocol candidate is Transparent Inter Process Communication (TIPC) protocol, which is also using "probe" messages for link-layer supervision—with the same drawbacks as mentioned above.

SUMMARY OF THE INVENTION

The present invention aims to overcome the above drawbacks.

According to a first aspect of the invention, a method is provided, comprising:
  receiving a data packet including an indication comprising at least one of a process state indication and a transmission state indication;
  comparing the indication with an expected indication; and
  determining if the data packet is valid or not based on a result of the comparison.

According to a second aspect of the invention, a device is provided, comprising:
  a receiving unit configured to receive a data packet including an indication comprising at least one of a process state indication and a transmission state indication;
  a comparing unit configured to compare the indication with an expected indication; and
  a determining unit configured to determine if the data packet is valid or not based on a result of the comparison by the comparing unit.

According to a third aspect of the invention, a method is provided, comprising:
  including an indication in a data packet to be transmitted, the indication comprising at least one of a process state indication and a transmission state indication, wherein the indication is to be compared at a receiving process receiving the data packet with an expected indication in order to detect whether a data packet including the indication is valid or not based on the comparison; and
  transmitting the data packet.

According to a fourth aspect of the invention, a device is provided, comprising:

an including unit configured to include an indication in a data packet to be transmitted, the indication comprising at least one of a process state indication and a transmission state indication, wherein the indication is to be compared at a receiving process receiving the data packet with an expected indication in order to detect whether a data packet including the indication is valid or not based on the comparison; and a transmitting unit configured to transmit the data packet.

In the first and second aspect, a process failure of a sending process sending the data packet may be detected in case an expected process state indication does not match the process state indication in the comparing.

Moreover, a transmission failure between the sending process sending the data packet and a receiving process receiving the data packet may be detected in case the expected transmission state indication does not match the transmission state indication in the comparing.

Furthermore, the expected transmission state indication may be initialised at start of the receiving process to a predetermined value Still further, the expected process state indication may be updated to the process state indication when the expected process state indication is older than the process state indication in the comparing. Also the expected transmission state indication may be updated to the transmission state indication when the expected process state indication is older than the process state indication in the comparing.

Still further, the data packet may be discarded when the expected process state indication is younger than the process state indication in the comparing.

Still further, the expected transmission state indication may be updated to the transmission state indication when the process state indication equals the expected process state indication and the expected transmission state indication is older than the transmission state indication in the comparing.

Still further, the data packet may be discarded when the process state indication equals the expected process state indication and the expected transmission state indication is younger than the transmission state indication in the comparing.

Still further, it may be determined if the data packet is the first data packet received since a process start of the receiving process receiving the data packet, the comparing may be skipped when it is determined that the data packet is the first data packet received since the process start, and the expected process state indication may be updated to the process state indication when it is determined that the data packet is the first data packet received since the process start. Also the expected transmission state indication may be updated to the transmission state indication when it is determined that the data packet is the first data packet received since the process start.

Still further, an indication may be included in a data packet to be transmitted, the indication comprising at least one of a process state indication and a transmission state indication.

The process state indication may be changed when a failure of an own process is detected. The transmission state indication may be changed when a transmission failure between a process to receive the data packet and the own process is detected.

In the third and fourth aspects, the process state indication may be assigned at a process start of a sending process sending the data packet.

Furthermore, the transmission state indication may be initialised at the process start of the sending process sending the data packet to a predetermined value for all processes.

Still further, the process state indication may be changed when a failure of the sending process sending the data packet is detected. The transmission state indication may be changed when a transmission failure between the sending process sending the data packet and the receiving process receiving the data packet is detected. The process state indication may be either increased strictly monotonic or decreased strictly monotonic when the failure of the sending process is detected. The transmission state indication may be either increased strictly monotonic or decreased strictly monotonic when the transmission failure between the sending process and the receiving process is detected.

Still further, the process state indication may be assigned by a central instance or by the sending process.

The invention can be implemented also as a computer program product and as a semiconductor chip.

The present invention enables highly efficient, reliable connection-less protocols. The invention combines high efficiency of connection-less communication (as known from UDP (User Datagram Protocol)), beneficial in a system with large number of mutually coupled communicating nodes and further a large number of mutually connected processes in each node, with robustness of connection-oriented protocols (such as TCP), adding failure-detection and -differentiation mechanisms, and introducing appropriate recovery strategies, while not depending on any specific protocol for inter-node communication. It is assumed that nodes can communicate over the network and that the communication protocol is able to detect network failures in case a transmission is unsuccessful.

The key idea is to include at least one indication in each packet's header from which the state of the network connection and/or the state of the peer node/process can be derived. Consequently failures can be detected with a low delay—as information is contained in each packet—while causing only very little network overhead. This makes it a perfect candidate as transport protocol in high-performance clusters, because it is efficient and robust at the same time.

DESCRIPTION OF THE PREFERRED EMBODIMENTS

Figure 1:
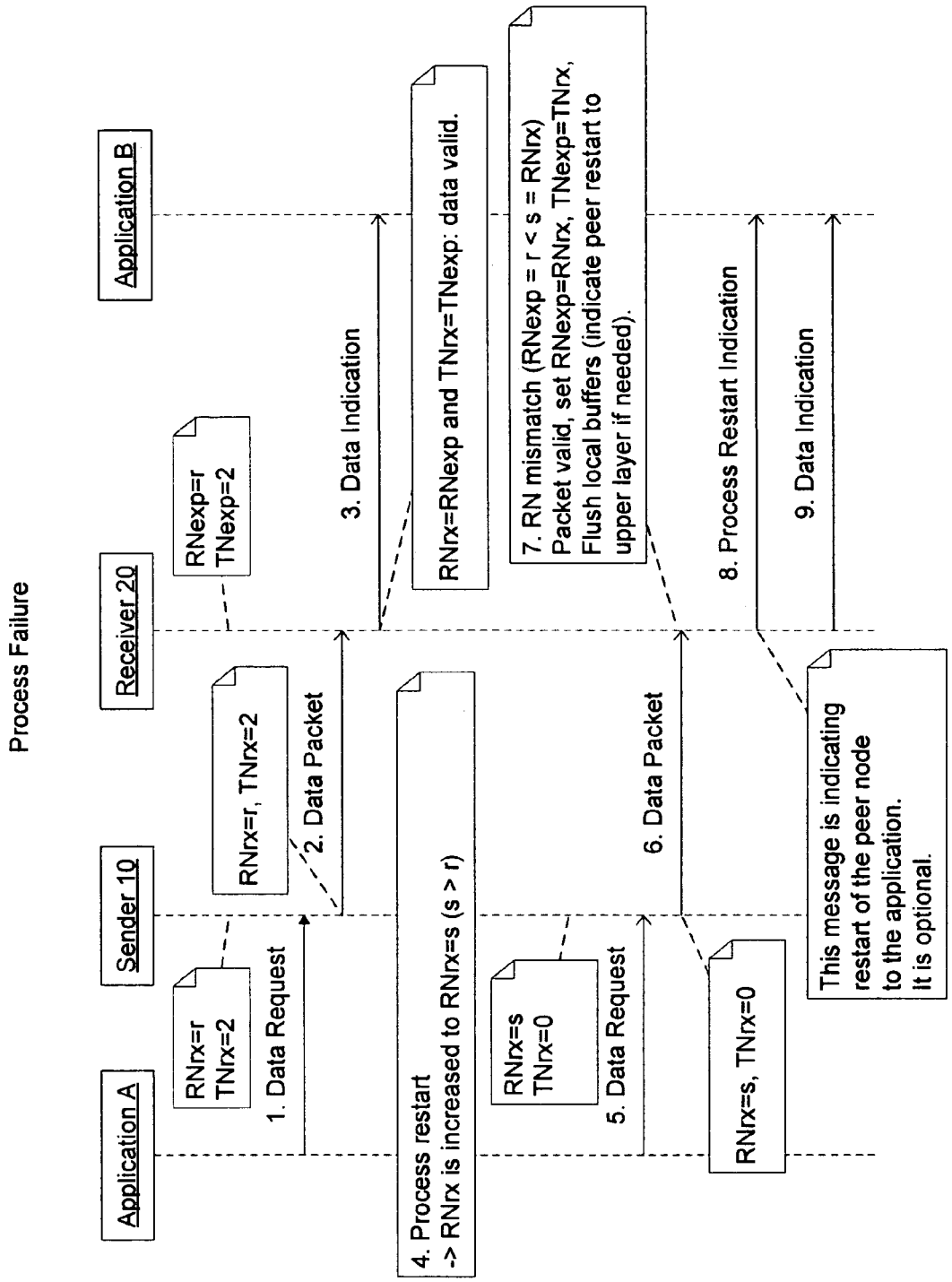
FIG. 1 shows a signalling diagram illustrating a failure differentiation and recovery mechanism according to a preferred embodiment of the invention at a receiving process in case of a node or process failure.

The terms "transmission restart" or "restart transmission" used throughout the description of the invention means that the sender of the data detects a network failure (e.g. due to a timeout while waiting for an acknowledgement, even after repeated transmit attempts), and restarts the transmission after recognizing that the network has recovered from the network failure and is up again. The primary re-transmission attempts, happening in case of missing acknowledgement(s), should not be understood as "transmission restart".

According to a preferred embodiment of the invention, a protocol is proposed which defines two numbers as used indications, a Reincarnation Number (RN) and a Transmission Number (TN). According to the preferred embodiment, both numbers are included in the header of each packet to be transferred. RN is assigned to each process within a distributed software system at start-up time of the process and has to be increasing strictly monotonic. For the initial assignment of the RN numbers at process start-up many alternatives exist. For example the initial RN can be assigned by a central instance (CI), or generated based on the previous RN value stored in the flash memory of the node, or it can be generated by every process itself. In the latter case special care has to be taken in order to ensure strictly growing monotonic characteristic of the RNs. A possible solution is to use system clock value at process start-up time.

As it is possible that only a subset of a node's processes fail (and thus restart) without the whole node being restarted, the receiver has to maintain one expected RN number per transmitting process.

TNs are initialized (preferably to zero) and incremented when a network failure during data transmission to a peer process has been detected by a transmitting network layer. As it is related to that specific target process, one TN per target process has to be stored.

It is to be noted that RN and TN are not restricted to numbers. Other means for indicating a process or transmission restart are possible, e.g. letters. Further on RN and TN can be also strictly monotonic decreasing instead of increasing. Also a mixture of increasing and decreasing indications is possible.

Throughout the rest of the description of the preferred embodiment it is assumed that RN and TN indications are implemented as strictly monotonic increasing numbers, if not stated explicitly otherwise.

When a packet is being received by the protocol, expected RN and TN numbers in the receiving process ($RN_{exp}$ and $TN_{exp}$ respectively) are checked against those contained in the packet ($RN_{rx}$ and $TN_{rx}$ respectively)

| RN | TN | Scenario |
| --- | --- | --- |
| $RN_{rx} = RN_{exp}$ | $TN_{rx} = TN_{exp}$ | No disturbance in communication, packet is valid. |
| $RN_{rx} < RN_{exp}$ | $TN_{rx}$ = any | Peer process was restarted (process/node failure), discard this packet (it is originating from the "old" instance of the process). |
| $RN_{rx} = RN_{exp}$ | $TN_{rx} < TN_{exp}$ | Peer process restarted transmission (due to network failure), discard this packet (it was sent before the network failure occurred). |
| $RN_{rx} = RN_{exp}$ | $TN_{rx} > TN_{exp}$ | Peer process restarted transmission (due to network failure), packet can be processed as it was sent after transmission restart. Update $TN_{exp}$ to $TN_{rx}$. |
| $RN_{rx} > RN_{exp}$ | $TN_{rx}$ = any | Peer process was restarted (process/node failure), packet can be processed as it is originating from the "new" instance of the process. Update $TN_{exp}$ to $TN_{rx}$ and $RN_{exp}$ to $RN_{rx}$. |

In other words, in case the expected $RN_{exp}$ and $TN_{exp}$ numbers in the receiving process are equal to the numbers $RN_{rx}$ and $TN_{rx}$ contained in the packet received by the receiving process, the packet is valid.

In case the expected $RN_{exp}$ is greater than $RN_{rx}$ (regardless of the relationship of $TN_{exp}$ and $TN_{rx}$), this indicates that the peer process was restarted (i.e. a process or node failure occurred). This packet has to be discarded since it is originating from the "old" instance of the peer process. $TN_{exp}$ and $RN_{exp}$ remain unchanged, as $RN_{exp}$ has already been updated to the RN of the "new" instance. In case of process or node restart TN needs re-initialization (which happens when first valid packet is received).

In case $RN_{exp}$ equals $RN_{rx}$ but $TN_{exp}$ is greater than $TN_{rx}$, this indicates that the peer process restarted transmission (due to a network failure). This packet has to be discarded since it had been sent before the network failure occurred. $TN_{exp}$ and $RN_{exp}$ remain unchanged. $TN_{exp}$ has already been updated to the TN of the "new" peer instance.

In case $RN_{exp}$ equals $RN_{rx}$ but $TN_{exp}$ is smaller than $TN_{rx}$, this indicates that the peer process restarted transmission (due to a network failure). Nevertheless, this packet can be processed as it was sent after transmission restart. Thus, in the receiving process $TN_{exp}$ is updated to $TN_{rx}$.

Finally, in case the expected $RN_{exp}$ is smaller than $RN_{rx}$ (regardless of the relationship of $TN_{exp}$ and $TN_{rx}$), this indicates that the peer process was restarted (i.e. a process or node failure occurred). Nevertheless, this packet can be processed as it is originating from the "new" instance of the peer process. Thus, in the receiving process $TN_{exp}$ is updated to $TN_{rx}$, and $RN_{exp}$ is updated to $RN_{rx}$.

When the receiving process as described above starts, the $RN_{exp}$ number may be set to "un-initialised". The first received $RN_{rx}$ number is then accepted as $RN_{exp}$ number together with the received $TN_{rx}$ number which is accepted as $TN_{exp}$, and from then onwards the processes of comparing $RN_{rx}$ with $RN_{exp}$ and updating $RN_{exp}$ with $RN_{rx}$ when $RN_{rx}$ is newer than $RN_{exp}$ start.

Once again it should be noted that the strictly growing of the RN and TN is just one way of implementing the present invention. In practise any kind of mechanism to identify that a process or a transmission has been restarted could be utilised, for example also the strictly reduction of RN and TN would be possible, or using alphabetic letters or some other signs instead of numbers.

The invention offers a non-complex, and at the same time robust, mechanism to provide highly efficient and fault-tolerant inter-node communication in distributed systems, such as computer clusters. Recent developments in high-performance computing have shown that further boosts in computing systems' performance can only be expected by using distributed systems, putting more and more importance to efficient communication in such systems. Currently available solutions in this area (TCP and UDP for example) have proven to work quite well, but looking at future demands (for example in telecommunication equipment) efficiency and robustness are not at an acceptable level.

Compared to other network transport protocols the present invention provides a non-complex way of differentiating network and node failures in a distributed system. No special messaging is needed to achieve this and network overhead produced by additional information in packet header is very small. Protocols using this invention will provide higher throughput combined with better fault-tolerance to the user.

The invention provides TCP-like features while using connection-less communication only. This is beneficial for distributed systems, because high amount of connections in full-mesh topology systems causes remarkable load in the processing endpoints simply for maintaining the connections (contexts, acknowledgements, keep-alive messaging, etc). Additionally listening on a high number of open connections (for incoming data) is a resource demanding task. Thus the benefit can be seen mostly in OS level on peer machines.

An example for a distributed software system in which the invention is applicable are 3G RNC (Third Generation mobile networks Radio Network Controller) products in cellular networks.

With the connection-less protocol of the invention a local process needs to store only very little context information per (node, application) pair, namely RN and TN numbers. Beyond that no context information needs to be kept. Looking at TCP, OS (Operating System) needs to keep (connection) information for each (node, application) pair that will potentially be used at some time.

As the mechanism according to the invention is able to differentiate between network and node related failures it is possible to "resume" operation after a network failure; this saves re-establishment/retransmissions.

The present invention proposes a lightweight protocol: Header overhead is low compared to IP+TCP. Keeping in mind that the typical packet size in telecommunication applications is rather small, the size of the overhead becomes even more critical.

Furthermore, as mentioned above, connection-oriented protocols require more resources in the communication endpoints than the connection-less protocol according to the invention.

Moreover, the invention reduces signalling load: No handshake is needed at start-up, connection re-establishment after failure, etc. According to the invention, all information is carried in the header of each packet (i.e. as RN and TN numbers as explained in the preferred embodiment above).

In the following, the failure differentiation and recovery mechanism according to the invention will be described in case of a process or node failure and in case of a network failure by referring to FIGS. 1 and 2, respectively.

FIG. 1 shows a signalling diagram illustrating the failure differentiation and recovery mechanism according to the preferred embodiment of the invention in case of a node or process failure.

In case an application A issues a data request towards an application B, at first the data request is sent to a sender 10 (communication 1 or Data Request 1 in FIG. 1). The sender 10 is a transmitting process in a node of a distributed system. $RN_{rx}$ of the sender 10 has been set to r at start-up, and $TN_{rx}$ is set to 2.

Then, in a communication 2 in FIG. 1, a packet is sent from the sender 10 to the receiver 20 associated with the application B. In the header of the packet $RN_{rx}$ and $TN_{rx}$ are included. At the receiver 20 which is a receiving process, the expected $RN_{exp}$ of the sender 10 has been set to r, and $TN_{exp}$ has been set to 2 according to the $RN_{rx}$ and $TN_{rx}$ values of the previously received valid packet. Since the expected $RN_{exp}$ and $TN_{exp}$ numbers in the receiver are equal to the numbers $RN_{rx}$ and $TN_{rx}$ contained in the packet received by the receiver 20, the packet is valid and the data is indicated to application B (communication 3 in FIG. 1).

In a procedure 4 shown in FIG. 1 a process restart occurs. Thus, $RN_{rx}$ of the sender 10 (and the application A) is increased to s (s>r). After the restart, $TN_{rx}$ is initialized to zero. In case a data request is sent from application A to the sender 10 after the restart of the node or process (communication 5 in FIG. 1), a data packet is sent from the sender 10 to the receiver 20, the data packet header including $RN_{rx}$=s and $TN_{rx}$=0 (communication 6 in FIG. 1).

In procedure 7 in FIG. 1, at the receiver 20 an RN mismatch is detected, since the expected $RN_{exp}$ is r in the receiver 20, but RN=s was received via the data packet which is newer (bigger) compared to RN=r. Thus, local buffers are flushed at the receiver 20 and peer restart may be indicated to upper layer if needed. $TN_{exp}$ is set to $TN_{rx}$ and $RN_{exp}$ is set to $RN_{rx}$. The received data is processed since it is originating from the "new" instance of the peer process. Therefore, in communication 8 in FIG. 1 the data are indicated to application B.

From the description of FIG. 1 it can be seen that according to the invention a node or process failure can be detected as node or process failure and corresponding recovery measures can be taken without the need of additional signalling or connection re-establishment.

Figure 2:
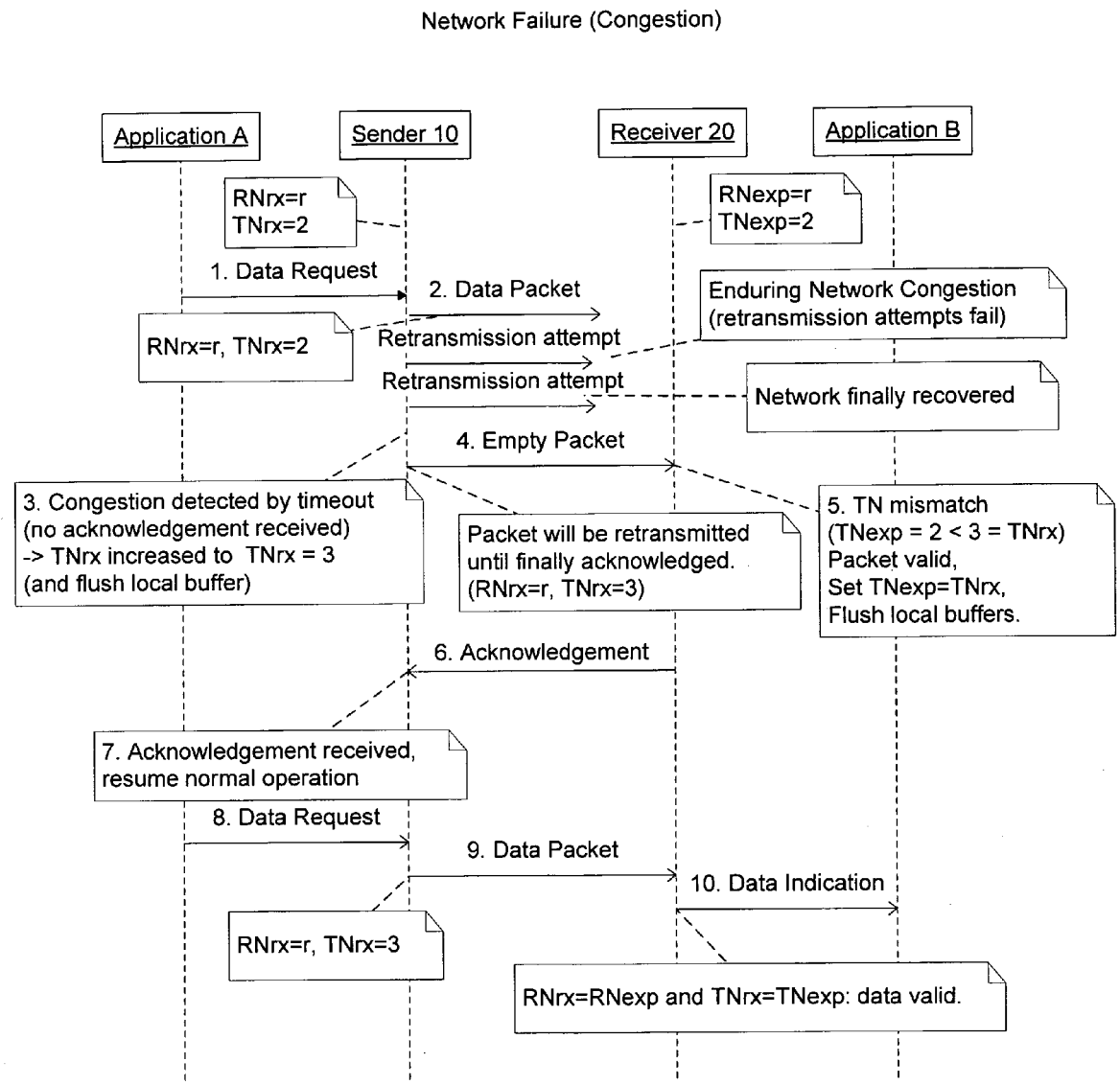
FIG. 2 shows a signalling diagram illustrating the failure differentiation and recovery mechanism according to the preferred embodiment of the invention at a receiving process in case of a network failure.

FIG. 2 shows a signalling diagram illustrating the failure differentiation and recovery mechanism according to the preferred embodiment of the invention in case of a network failure.

In case application A issues a data request towards application B, at first the data request is sent to the sender 10 (communication 1 in FIG. 2). $RN_{rx}$ of the sender 10 has been set to r at start-up, and $TN_{rx}$ is set to 2.

Then, in a communication 2 in FIG. 2, a data packet is sent from the sender 10 to the receiver 20 associated with the application B. In the data packet header $RN_{rx}$ and $TN_{rx}$ are included. At the receiver 20, the expected $RN_{exp}$ of the sender 10 has been set to r, and $TN_{exp}$ is set to 2.

However, e.g. due to network congestion, the data packet does not reach the receiver 20. In a step 3 in FIG. 2 the congestion is detected by timeout due to no acknowledgment received for the receiver 20. Thus, $TN_{rx}$ is increased to TN=3 (and local buffer is flushed). In communication 4 in FIG. 2 an empty packet including $RN_{rx}$=r and $TN_{rx}$=3 is transmitted to the receiver 20. This packet will be repeatedly transmitted until finally acknowledged by receiver 20.

In process 5 in FIG. 2 the receiver 20 detects that $RN_{rx}$ equals $RN_{exp}$ and that $TN_{rx}$ is bigger than $TN_{exp}$ and flushes the local buffers. Since $TN_{rx}$ is greater (newer) than $TN_{exp}$, i.e. the empty packet was sent after transmission restart, the empty packet can be processed. Thus, the receiver 20 updates $TN_{exp}$ to $TN_{rx}$ and transmits an acknowledgement to the sender 10 acknowledging the empty packet (communication 6 in FIG. 2). In a process 7 in FIG. 2 the sender 10 receives the acknowledgment and resumes normal operation.

As a result, when in a communication 8 in FIG. 2 a data request is issued by application A towards application B, the sender 10 sends a data packet including $RN_{rx}$=r and $TN_{rx}$=3 to the receiver 20. Since $RN_{rx}$ and $TN_{rx}$ are equal to the expected $RN_{exp}$ and $TN_{exp}$, the data packet is valid and the data is indicated to application B.

From the description of FIG. 2 it can be seen that according to the invention a network failure (e.g. due to congestion) can be detected as network failure and corresponding recovery measures can be taken.

Figure 3:
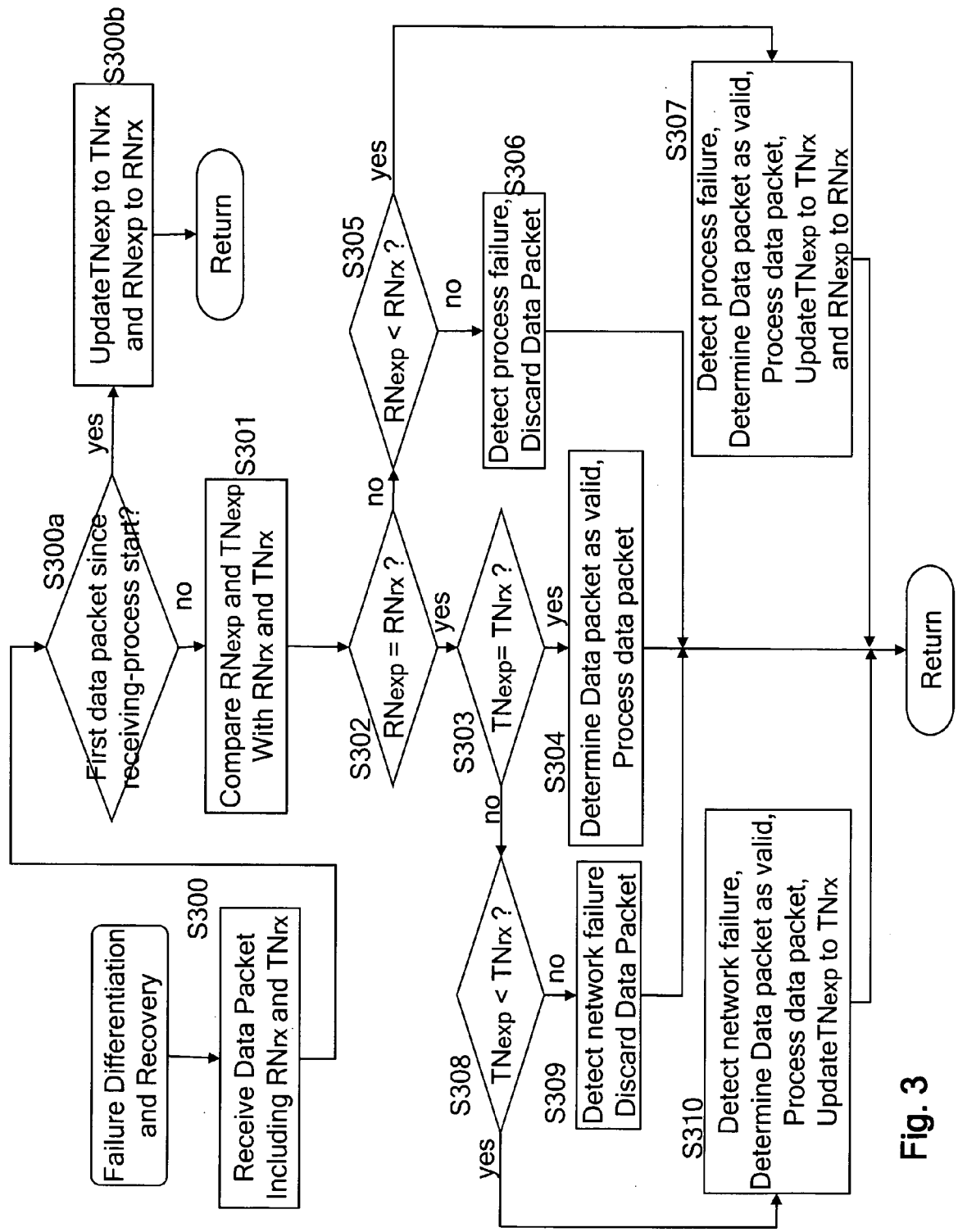
FIG. 3 shows a flow chart further illustrating the preferred embodiment of the failure differentiation and recovery mechanism according to the invention.

FIG. 3 shows a flow chart further illustrating the preferred embodiment of the failure differentiation and recovery mechanism at a receiving process according to the invention.

In step S300 a data packet including numbers $RN_{rx}$ and $TN_{rx}$ is received at a receiving process at a node of a distributed system. In step S300a it is determined if the data packet is the first data packet received since a (re-)start of the receiving process. When it is determined that the data packet is the first data packet received since the process (re-)start, the expected numbers $RN_{exp}$ and $TN_{exp}$ are updated to the received numbers $RN_{rx}$ and $TN_{rx}$ in step S300b. Otherwise, the flow proceeds to step S301.

In step S301, the received $RN_{rx}$ and $TN_{rx}$ are compared to expected numbers $RN_{exp}$ and $TN_{exp}$ of the process receiving the data packet. In case the numbers match, i.e. yes in steps S302, S303, in step S304 it is determined that the data packet is valid and is processed further.

However, in case $RN_{exp}$ does not match $RN_{rx}$ in step S302, it is checked in step S305 whether $RN_{exp}$ is smaller than $RN_{rx}$. If the result is no in step S305, a process or node related failure of the remote peer has happened and the present packet was originated from the old instance of the sending process, therefore the data packet is discarded in step S306. If the result is yes in step S305, also a process or node failure of the remote peer is detected in step S307, however, as described beforehand, in this case the data packet is valid and can be processed further. Moreover, $TN_{exp}$ is updated to $TN_{rx}$ and $RN_{exp}$ is updated to $RN_{rx}$.

In case $RN_{exp}$ matches $RN_{rx}$ but $TN_{exp}$ does not match $TN_{rx}$, i.e. the result is no in step S303, it is checked in step S308 whether $TN_{exp}$ is smaller than $TN_{rx}$. If the result is no in step S308, a network failure is detected in step S309 which resulted in the re-start of the transmission by the remote peer process. The present packet was originated by the old transmission and sent before the re-start of the transmission by the remote peer process, therefore the data packet is discarded. If the result is yes in step S308, also a network failure is detected in step S310, however, as described beforehand, in this case the data packet is valid (originated by the peer process after re-starting the transmission) and can be processed further. Moreover, $TN_{exp}$ is updated to $TN_{rx}$.

In case merely RN is used as indication in each packet's header from which the state of the node/process can be derived, in step S300 a data packet including a number $RN_{rx}$ is received at a process of a distributed system. In step S301, the received $RN_{rx}$ is compared to an expected number $RN_{exp}$ of the process receiving the data packet. In case the numbers match, i.e. yes in step S302, in step S304 it is determined that the data packet is valid and is processed further (i.e. steps S303 and S308-S310 are skipped). In case $RN_{exp}$ does not match $RN_{rx}$ in step S302, the following procedure is the same as in the case of using both RN and TN indications despite that in step S307 merely $RN_{exp}$ is updated.

Figure 4:
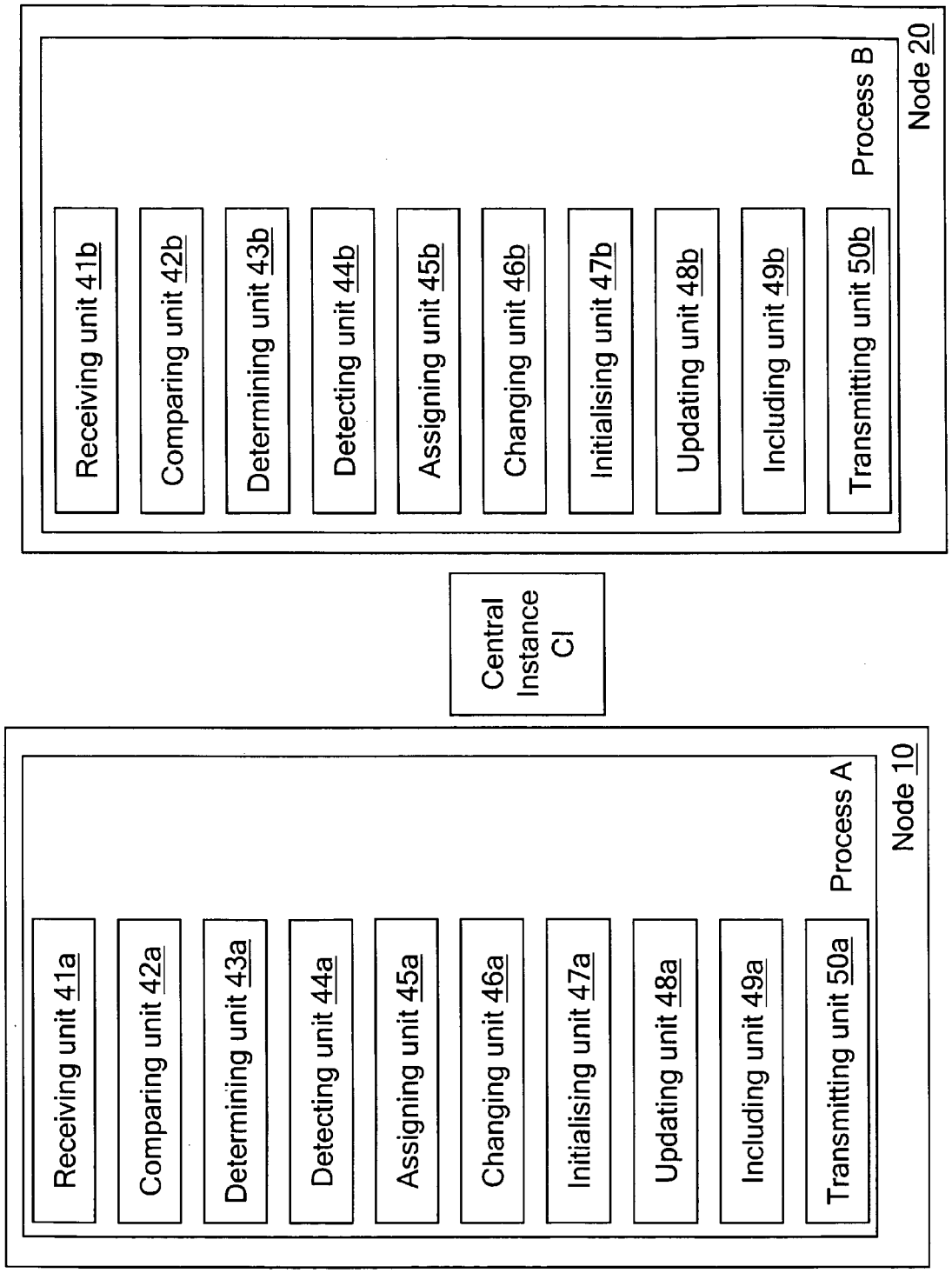
FIG. 4 shows a schematic block diagram illustrating network devices according to the preferred embodiment of the invention.

FIG. 4 shows a schematic block diagram illustrating network devices according to the preferred embodiment of the invention.

As shown in FIG. 4, a process A at a node 10 comprises a receiving unit 41a, a comparing unit 42a and a determining unit 43a. The process A may further comprise a detecting unit 44a, an assigning unit 45a, a changing unit 46a such as for example a counter, an initialising unit 47a, an updating unit 48a, an including unit 49a and a transmitting unit 50a.

Similarly, a process B at a node 20 comprises a receiving unit 41b, a comparing unit 42b and a determining unit 43b. The process B may further comprise a detecting unit 44b, an assigning unit 45b, a changing unit 46b such as for example a counter, an initialising unit 47b, an updating unit 48b, an including unit 49b and a transmitting unit 50b. It should be noted that the changing units 46a and 46b are arranged to perform actions like increasing, decreasing or comparable actions. In the preferred embodiment the changing unit performs increasing actions.

The nodes 10 and 20 may be part of a distributed system such as high-performance computer clusters. The node 10 may comprise a plurality of processes A. Likewise, the node 20 may comprise a plurality of processes B. The processes A and B may use a connection-less protocol for exchanging data packets.

When the receiving unit 41b of process B receives a data packet, the data packet includes an indication allowing to detect a process or node related failure (i.e. by utilising at least one dedicated number) and another indication allowing to detect network (i.e. transmission) related failures (i.e. by utilising at least one dedicated number for this purpose), the comparing unit 42b compares the indications with the expected indications (i.e. comparing the indication for detecting a process or node related failure with the expected indication for process or node related failures and comparing the indication for detecting a network failure with the expected indication for network failures). Then the determining unit 43b determines a status of a process based on a result by the comparing unit 42b.

It is assumed that the data packet has been transmitted from the transmitting unit 50a of process A. The including unit 49a has included the indication of process A in the data packet.

The indication may comprise a reincarnation number $RN_{rx}$ for detecting process or node failures having resulted in restarting of one or more processes A in node 10, and the expected indication may comprise an expected reincarnation number $RN_{exp}$. The comparing unit 42b compares then the reincarnation number $RN_{rx}$ with the expected reincarnation number $RN_{exp}$.

In addition, the indication may comprise a transmission number $TN_{rx}$ for detecting network failures, and the expected indication may comprise an expected transmission number $TN_{exp}$. The comparing unit 42b then compares (also) the transmission number $TN_{rx}$ with the expected transmission number $TN_{exp}$.

The detecting unit 44b detects a failure of the peer process A, in case the expected reincarnation $RN_{exp}$ number does not match the reincarnation number $RN_{rx}$ in the comparing performed by the comparing unit 42b.

Moreover, the detecting unit 44b detects a network failure in case the expected transmission number $TN_{exp}$ does not match the transmission number $TN_{rx}$ in the comparing performed by the comparing unit 42b and the expected reincarnation number $RN_{exp}$ matches the reincarnation number $RN_{rx}$ in the comparing performed by the comparing unit 42b.

The updating unit 48b updates the expected reincarnation number $RN_{exp}$ to the reincarnation number $RN_{rx}$ when the expected reincarnation number $RN_{exp}$ is smaller (older) than the reincarnation number $RN_{rx}$ in the comparing performed by the comparing unit 42b. The updating unit 48b may also update the expected transmission number $TN_{exp}$ to the transmission number $TN_{rx}$ when the expected reincarnation number $RN_{exp}$ is smaller (older) than the reincarnation number $RN_{rx}$ in the comparing performed by the comparing unit 42b.

In case the expected reincarnation number $RN_{exp}$ is greater (newer) than the reincarnation number $RN_{rx}$ in the comparing performed by the comparing unit 42b or $RN_{exp}=RN_{rx}$ and the expected transmission number $TN_{exp}$ is greater (newer) than the transmission number $TN_{rx}$ in the comparing performed by the comparing unit 42b, the detecting unit 44b discards the data packet.

The reincarnation numbers are assigned at start-up to processes A and B. The reincarnation numbers can be assigned to the processes A and B by the assigning units 45a, 45b, respectively, or a Central Instance CI is used to generate and assign the RNs to the processes A and B. In the latter case, the receiving units 41a, 41b may receive the reincarnation numbers to be assigned to the processes A and B at start-up.

The changing unit 46a increases the reincarnation number of a process A when the process A is restarted. Similarly, the changing unit 46b increases the reincarnation number of a process B when the process B is restarted.

In case of decreasing instead of increasing the reincarnation number and the transmission number, the updating unit 48b updates the expected reincarnation number $RN_{exp}$ to the reincarnation number $RN_{rx}$ when the expected reincarnation number $RN_{exp}$ is bigger than the reincarnation number $RN_{rx}$ in the comparing performed by the comparing unit 42b. The updating unit 48b may also update the expected transmission number $TN_{exp}$ to the transmission number $TN_{rx}$ when the expected reincarnation number $RN_{exp}$ is bigger than the reincarnation number $RN_{rx}$ in the comparing performed by the comparing unit 42b.

Moreover, in the decreasing case, the updating unit 48b updates the expected transmission number $TN_{exp}$ to the transmission number $TN_{rx}$ when $RN_{exp}=RN_{rx}$ and the expected transmission number $TN_{exp}$ is bigger than the transmission number $TN_{rx}$ in the comparing performed by the comparing unit 42b.

In other words, the updating unit 48b updates the expected reincarnation number $RN_{exp}$ to the reincarnation number $RN_{rx}$ when the expected reincarnation number $RN_{exp}$ is older than the reincarnation number $RN_{rx}$ in the comparing performed by the comparing unit 42b. The updating unit 48b may also update the expected transmission number $TN_{exp}$ to the transmission number $TN_{rx}$ when the expected reincarnation number $RN_{exp}$ is older than the reincarnation number $RN_{rx}$ in the comparing performed by the comparing unit 42b.

Moreover, the updating unit 48b updates the expected transmission number $TN_{exp}$ to the transmission number $TN_{rx}$ when $RN_{exp}=RN_{rx}$ and the expected transmission number $TN_{exp}$ is older than the transmission number $TN_{rx}$ in the comparing performed by the comparing unit 42b.

In case the expected reincarnation number $RN_{exp}$ is younger than the reincarnation number $RN_{rx}$ or $RN_{exp}=RN_{rx}$ and the expected transmission number $TN_{exp}$ is younger than the transmission number $TN_{rx}$, the detecting unit 44b discards the data packet.

The expected reincarnation number may be assigned at process (re-)start such that it is older than any reincarnation number included in any data packet received.

Alternatively, an arbitrary ("un-initialized") expected reincarnation number is assigned at process (re-)start. Then, when a data packet is received by a process B, it is determined by the determining unit 43b first if the data packet is the first data packet received since the (re-)start of the process, and when it is determined that the data packet is the first data packet received since the process (re-)start, the comparing by the comparing unit 42b is skipped and the expected reincarnation number is updated to the reincarnation number included in the received data packet. Also the expected transmission number may be updated to the transmission number included in the received data packet when it is determined that the data packet is the first data packet received since the process (re-)start. In case the received data packet is not the first data packet received since the process (re-)start, the comparing and following processes are performed.

The transmission numbers are provided for each target process. The initialising unit 47a initialises the transmission numbers in process A for all target processes at (re-)start of process A to a predetermined value. Similarly, the initialising unit 47b initialises the transmission numbers in process B for all target processes at (re-)start of process B to a predetermined value. It is to be noted that transmission and reincarnation numbers are stored not only per process, but per each (source process, target process) pair, because processes even within the same node might be restarted independently or experience differing network failures.

The changing unit 46a increases the transmission number for a target process B in process A when a network failure of a transmission towards that process B is detected in process A. Similarly, the changing unit 46b increases the transmission number for a target process A in process B when a network failure of a transmission towards that process A is detected in process B.

Now preparation of the data packet received at the process B is considered. Assignment and initialisation of the reincarnation and transmission numbers for the process A preparing the data packet are effected as described above.

The including unit 49a includes the reincarnation number and the transmission number (if supported in addition to RN) in a data packet to be transmitted to the process B, and the transmitting unit 50a transmits the data packet.

The changing unit 46a changes (e.g. increases) the reincarnation number to be included in the data packet when the detecting unit 44a detects a failure of the process A. Moreover, the changing unit 46a changes the transmission number to be included in the data packet when the detecting unit 44a detects a transmission failure between the processes A and B.

It is to be noted that the network devices shown in FIG. 4 may have further functionality for working as nodes in a distributed system. Here the functions of the network devices relevant for understanding the principles of the invention are described using functional blocks as shown in FIG. 4. The arrangement of the functional blocks of the network devices is not construed to limit the invention, and the functions may be performed by one block or further split into sub-blocks.

Figure 5:
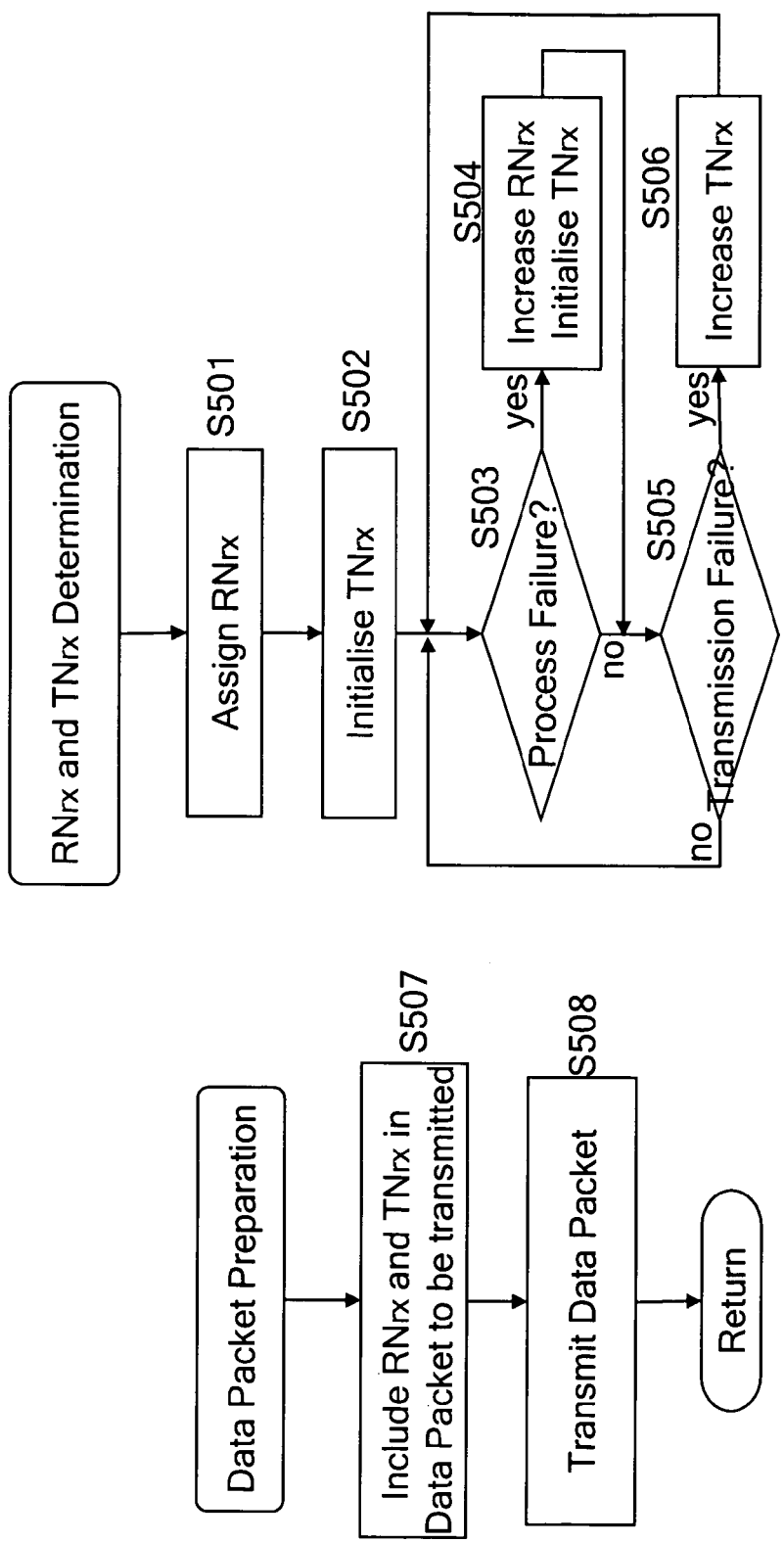
FIG. 5 shows a flow chart illustrating data packet preparation and indication determination according to the preferred embodiment of the invention at a transmitting process.

FIG. 5 shows a flow chart illustrating data packet preparation and indication determination according to the preferred embodiment of the invention.

At process start, $RN_{rx}$ is assigned and $TN_{rx}$ is initialised (steps S501, S502) as described above. In step S503 it is detected if a process failure occurred. If the result is Yes in step S503, $RN_{rx}$ is increased for the process in step S504 and $TN_{rx}$ is initialised. Then the flow proceeds to step S505.

If the result is No in step S503, the flow proceeds directly to step S505 where it is detected if a transmission failure from the process (i.e. the sending process) to another process (i.e. a receiving process) has occurred. If the result is Yes in step S505, $TN_{rx}$ corresponding to the transmission is increased in step S506.

If the result is No in step S505, the flow returns to step S503. Steps S503 to S506 are repeated.

When a data packet is to be transmitted from a sending process to a receiving process, the current $RN_{rx}$ of the sending process and the current $TN_{rx}$ of the transmission from the sending process to the receiving process, which have been determined in accordance with steps S501 to S506, are included in the data packet (step S507), and the data packet is transmitted to the receiving process (step S508).

It is to be noted that in case in step S507 merely the reincarnation number is included, steps S502, S505 and S506 can be omitted and in step S504 the initialization of $TN_{rx}$ can be omitted.

The present invention can also be implemented as computer program product.

For the purpose of the present invention as described above, it should be noted that method steps likely to be implemented as software code portions and being run using a processor at one of the network devices are software code independent and can be specified using any known or future developed programming language;

method steps and/or devices likely to be implemented as hardware components at one of the network devices are hardware independent and can be implemented using any known or future developed hardware technology or any hybrids of these, such as MOS, CMOS, BiCMOS, ECL, TTL, etc, using for example ASIC components or DSP components, as an example;

generally, any method step is suitable to be implemented as software or by hardware without changing the idea of the present invention.

Finally, it is to be understood that the above description is illustrative of the invention and is not to be construed as limiting the invention. Various modifications and applications may occur to those skilled in the art without departing from the true spirit and scope of the invention as defined by the appended claims.

What is claimed is:

1. A method comprising
configuring at least one processor to perform functions comprising:
receiving at a receiving process a data packet including an indication comprising a process state indication indicative of a state of a sending process sending the data packet and a transmission state indication indicative of a state of a network connection between the sending process and the receiving process, wherein the indication is received in a header of the data packet;
determining if the data packet is the first data packet received since a process start of the receiving process receiving the data packet;
comparing the indication with an expected indication if it is not determined that the data packet is the first data packet received since the process start and skipping the comparison if it determined that the data packet is the first data packet received since the process start;
updating an expected process state indication to the process state indication when it is determined that the data packet is the first data packet received since the process start;
updating an expected transmission state indication to the transmission state indication when it is determined that the data packet is the first data packet received since the process start; and
if the data packet is not the first data packet received since the process start, determining if the data packet is valid or is not valid based on a result of the comparison.

2. The method of claim 1, wherein the functions further comprise:
detecting a process failure of the sending process sending the data packet in case an expected process state indication does not match the process state indication received in the header of the data packet.

3. The method of claim 1, wherein the functions further comprise:
detecting a transmission failure between the sending process sending the data packet and the receiving process receiving the data packet in case an expected transmission state indication does not match the transmission state indication received in the header of the data packet.

4. The method of claim 1, wherein the functions further comprise:
updating an expected process state indication to the process state indication when the expected process state indication is older than the process state indication.

5. The method of claim 1, wherein the functions further comprise:
discarding the data packet when an expected process state indication is younger than the process state indication.

6. The method of claim 1, wherein the functions further comprise:
updating an expected process state indication to the process state indication and updating an expected transmission state indication to the transmission state indication when the expected process state indication is older than the process state indication.

7. The method of claim 1, wherein the functions further comprise:
updating an expected transmission state indication to the transmission state indication when the process state indication equals an expected process state indication and the expected transmission state indication is older than the transmission state indication.

8. The method of claim 1, wherein the functions further comprise:
discarding the data packet when the process state indication equals an expected process state indication and an expected transmission state indication is younger than the transmission state indication.

9. The method of claim 1, wherein the functions further comprise:
including an indication in a data packet to be transmitted, the indication comprising at least one of a process state indication and a transmission state indication.

10. The method of claim 9, wherein the functions further comprise:
charging the process state indication when a failure of an own process is detected.

11. The method of claim 9, wherein the functions further comprise:
changing the transmission state indication when a transmission failure between a process to receive the data packet and an own process is detected.

12. A method comprising
configuring at least one processor to perform functions comprising:
including an indication in a data packet to be transmitted, the indication comprising a process state indication indicative of a state of a sending process sending the data packet and a transmission state indication indicative of a state of a network connection between the sending process and a receiving process to which the data packet is to be sent, where the indication is included in a header of the data packet;
wherein the indication is configured to be compared at the receiving process with an expected indication if the data packet is not the first data packet received since the process start and with the comparison being skipped if the data packet is the first data packet received since the process start, and wherein the indication is further configured, if the data packet is the first data packet received since the process start, to cause updating of an expected process state indication to the process state indication and an expected transmission state indication to the transmission state indication; and
transmitting the data packet.

13. The method of claim 12, wherein the functions further comprise:
assigning the process state indication at a process start of the sending process sending the data packet.

14. The method of claim 12, wherein the functions further comprise:
initializing the transmission state indication at a process start of the sending process sending the data packet to a predetermined value for all processes.

15. The method of claim 12, wherein the functions further comprise:
changing the process state indication when a failure of the sending process sending the data packet is detected.

16. The method of claim 12, wherein the functions further comprise:
changing the transmission state indication when a transmission failure between the sending process sending the data packet and the receiving process receiving the data packet is detected.

17. The method of claim 15, wherein the process state indication is either increased strictly monotonic or decreased strictly monotonic when the failure of the sending process is detected.

18. The method of claim 16, wherein the transmission state indication is either increased strictly monotonic or decreased strictly monotonic when the transmission failure between the sending process and the receiving process is detected.

19. The method of claim 13, wherein the process state indication is assigned by a central instance.

20. The method of claim 13, wherein the process state indication is assigned by the sending process.

21. A non-transitory computer-readable medium storing a program of instructions which, when executed by a processor, configure an apparatus to perform actions comprising:
receiving at a receiving process a data packet including an indication comprising a process state indication indicative of a state of a sending process sending the data packet and a transmission state indication indicative of a state of a network connection between the sending process and the receiving process, wherein the indication is received in a header of the data packet;
determining if the data packet is the first data packet received since a process start of the receiving process receiving the data packet;
comparing the indication with an expected indication if it is determined that the data packet is not the first data packet received since the process start and skipping the comparison if it is determined that the data packet is the first data packet received since the process start;
updating an expected process state indication to the process state indication and updating an expected transmission state indication to the transmission state indication when it is determined that the data packet is the first data packet received since the process start; and
if the data packet is not the first data packet received since the process start, determining if the data packet is valid or is not valid based on a result of the comparison.

22. A non-transitory computer-readable medium storing a program of instructions which, when executed by a processor, configure an apparatus to perform actions comprising:
including an indication in a data packet to be transmitted, the indication comprising a process state indication indicative of a state of a sending process sending the data packet and a transmission state indication indicative of a state of a network connection between the sending process and a receiving process to which the data packet is to be sent, where the indication is included in a header of the data packet, where the indication is configured to be compared at the receiving process with an expected indication in order to detect whether the data packet including the indication is valid or is not valid if the data packet is not the first data packet received since the process start and with the comparison being skipped if the data packet is the first data packet received since the process start, and wherein the indication is further configured, if the data packet is the first data packet received since the process start, to cause updating of an expected process state indication to the process state indication and an expected transmission state indication to the transmission state indication; and
transmitting the data packet.

23. The non-transitory computer readable medium according to claim 21, wherein the program is loadable into an internal memory of the processing device.

24. A semiconductor chip comprising:
a receiving circuit configured to receive at a receiving process a data packet including an indication comprising a process state indication indicative of a state of a sending process sending the data packet and a transmission state indication indicative of a state of a network connection between the sending process and the receiving process, wherein the indication is configured to be received in a header of the data packet, wherein the receiving circuit is further configured to update an expected process state indication to the process state indication when it is determined that the data packet is the first data packet received since the process start and to update an expected transmission state indication to the transmission state indication when it is determined that the data packet is the first data packet received since the process start;
a comparing circuit configured to compare the indication with an expected indication if it is determined that the data packet is not the first data packet received since the process start and to skip the comparison if it determined that the data packet is the first data packet received since the process start; and
a determining circuit configured to determine if the data packet is valid or is not valid based on a result of the comparison by the comparing circuit.

25. A semiconductor chip comprising:
an including circuit configured to include an indication in a data packet to be transmitted, the indication comprising process state indication indicative of a state of a sending process sending the data packet and a transmission state indication indicative of a state of a network connection between the sending process and a receiving process to which the data packet is to be sent, the indication configured to be included in a header of the data packet, wherein the indication is configured to be compared at the receiving process with an expected indication in order to detect whether the data packet including the indication is valid or is not valid if it is determined that the data packet is not the first data packet received since the process start and with the comparison being skipped if the receiving process determines that the data packet is the first data packet received since the process start, and wherein the indication is further configured, if the data packet is the first data packet received since the process start, to cause updating of an expected process state indication to the process state indication and an expected transmission state indication to the transmission state indication; and a transmitting circuit configured to transmit the data packet.

26. A device comprising:
a computer including a processor and a memory;
receiving means for controlling the processor to direct receiving at a receiving process a data packet including an indication comprising a process state indication indicative of a state of a sending process sending the data packet and a transmission state indication indicative of a state of a network connection between the sending process and the receiving process, wherein the indication is configured to be received in a header of the data packet, wherein the processor is further controlled to update an expected process state indication to the process state indication when it is determined that the data packet is the first data packet received since the process start and to update an expected transmission state indication to the transmission state indication when it is determined that the data packet is the first data packet received since the process start;
comparing means for controlling the processor to compare the indication with an expected indication if it is determined that the data packet is not the first data packet received since the process start and to skip the comparison if it determined that the data packet is the first data packet received since the process start; and
determining means for controlling the processor to determine if the data packet is valid or is not valid based on a result of the comparison by the comparing means.

27. A device comprising:
a computer including a processor and a memory;
including means for controlling the processor to include an indication in a data packet to be transmitted, the indication comprising a process state indication indicative of a state of a sending process sending the data packet and a transmission state indication indicative of a state of a network connection between the sending process and a receiving process to which the packet is to be sent, the indication configured to be included in a header of the data packet, wherein the indication is configured to be compared at the receiving process with an expected indication in order to detect whether the data packet including the indication is valid or is not valid if the data packet is the not first data packet received since the process start and with the comparison being skipped if it is determined that the data packet is the first data packet received since the process start, and wherein the indication is further configured, if the data packet is the first data packet received since the process start, to cause updating of an expected process state indication to the process state indication and an expected transmission state indication to the transmission state indication; and
transmitting means for transmitting the data packet.

28. An apparatus, comprising:
a processor; and
a memory including computer program code, where the memory and computer program code are configured to, with the processor, cause the apparatus at least to,
receive at a receiving process a data packet including an indication comprising a process state indication indicative of a state of a sending process sending the data packet and a transmission state indication indicative of a state of a network connection between the sending process and the receiving process, wherein the indication is received in a header of the data packet;
determine if the data packet is the first data packet received since the process start;
update an expected process state indication to the process state indication when it is determined that the data packet is the first data packet received since the process start and to update an expected transmission state indication to the transmission state indication when it is determined that the data packet is the first data packet received since the process start;
compare the indication with an expected indication if it is determined that the data packet is not the first data packet received since the process start and skip the comparison if it determined that the data packet is the first data packet received since the process start; and
determine if the data packet is valid or is not valid based on a result of the comparison.

29. The apparatus of claim 28, where the apparatus is further configured to:
detect a process failure of the sending process sending the data packet in case an expected process state indication does not match the process state indication received in the header of the data packet.

30. The apparatus of claim 28, where the apparatus is further configured to:
detect a transmission failure between the sending process sending the data packet and the receiving process receiving the data packet in case an expected transmission state indication does not match the transmission state indication received in the header of the data packet.

31. The apparatus of claim 28, where the apparatus is further configured to:
update an expected process state indication to the process state indication when the expected process state indication is older than the process state indication.

32. The apparatus of claim 28, where the apparatus is further configured to:
discard the data packet when an expected process state indication is younger than the process state indication.

33. The apparatus of claim 28, where the apparatus is further configured to:
update an expected process state indication to the process state indication and update an expected transmission state indication to the transmission state indication when the expected process state indication is older than the process state indication.

34. The apparatus of claim 28, where the apparatus is further configured to:
update an expected transmission state indication to the transmission state indication when the process state indication equals an expected process state indication and the expected transmission state indication is older than the transmission state indication.

35. The apparatus of claim 28, where the apparatus is further configured to:
discard the data packet when the process state indication equals an expected process state indication and an expected transmission state indication is younger than the transmission state indication.

36. The apparatus of claim 28, where the apparatus is further configured to:
include an indication in a data packet to be transmitted, the indication comprising at least one of a process state indication and a transmission state indication.

37. The apparatus of claim 36, where the apparatus is further configured to:
change the process state indication when a failure of an own process is detected.

38. The apparatus of claim 36, where the apparatus is further configured to:

change the transmission state indication when a transmission failure between a process to receive the data packet and an own process is detected.

39. An apparatus, comprising:

a processor; and a memory including computer program code, where the memory and computer program code are configured to, with the processor, cause the apparatus at least to, include an indication in a data packet to be transmitted, the indication comprising a process state indication indicative of a state of a sending process sending the data packet and a transmission state indication indicative of a state of a network connection between the sending process and a receiving process to which the data packet is to be sent, where the indication is included in a header of the data packet, where the indication is configured to be compared at the receiving process with an expected indication in order to detect whether the data packet including the indication is valid or is not valid if the data packet is not the first data packet received since the process start and with the comparison being skipped if the data packet is the first data packet received since the process start, and wherein the indication is further configured, if the data packet is the first data packet received since the process start, to cause updating of an expected process state indication to the process state indication and an expected transmission state indication to the transmission state indication; and transmit the data packet.

40. The apparatus of claim 39, where the apparatus is further configured to:

assign the process state indication at a process start of the sending process sending the data packet.

41. The apparatus of claim 39, where the apparatus is further configured to:

initialize the transmission state indication to a predetermined value for all processes at a process start of the sending process sending the data packet.

42. The apparatus of claim 39, where the apparatus is further configured to:

change the process state indication when a failure of the sending process sending the data packet is detected.

43. The apparatus of claim 39, where the apparatus is further configured to:

change the transmission state indication when a transmission failure between the sending process sending the data packet and the receiving process receiving the data packet is detected.

44. The apparatus of claim 42, where the process state indication is either increased strictly monotonic or decreased strictly monotonic when the failure of the sending process is detected.

45. The apparatus of claim 43, where the transmission state indication is either increased strictly monotonic or decreased strictly monotonic when the transmission failure between the sending process and the receiving process is detected.

46. The apparatus of claim 40, where the process state indication is assigned by one of a central instance or the sending process.

* * * * *

UNITED STATES PATENT AND TRADEMARK OFFICE
CERTIFICATE OF CORRECTION

| | | |
|---|---|---|
| PATENT NO. | : 8,166,156 B2 | Page 1 of 1 |
| APPLICATION NO. | : 11/606093 | |
| DATED | : April 24, 2012 | |
| INVENTOR(S) | : Frey et al. | |

It is certified that error appears in the above-identified patent and that said Letters Patent is hereby corrected as shown below:

Claim 10, col. 14, line 37 delete "charging" and insert --changing--.

Signed and Sealed this
Nineteenth Day of June, 2012

David J. Kappos
*Director of the United States Patent and Trademark Office*